United States Patent
Higashino et al.

(10) Patent No.: US 7,342,340 B2
(45) Date of Patent: Mar. 11, 2008

(54) ALTERNATOR WITH IDENTICAL CONDUCTOR SEGMENTS

(75) Inventors: Kyoko Higashino, Tokyo (JP); Toshiaki Kashihara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 233 days.

(21) Appl. No.: 10/898,946

(22) Filed: Jul. 27, 2004

(65) Prior Publication Data

US 2005/0168093 A1  Aug. 4, 2005

(30) Foreign Application Priority Data

Jan. 29, 2004  (JP)  ............. 2004-022107

(51) Int. Cl.
*H02K 3/04* (2006.01)

(52) U.S. Cl. ............ 310/201; 310/184; 310/180; 29/596

(58) Field of Classification Search ........ 310/201, 310/184; *H02K 3/04*
See application file for complete search history.

(56) References Cited

U.S. PATENT DOCUMENTS

| | | | |
|---|---|---|---|
| 6,177,747 B1 * | 1/2001 | Maeda et al. ........... 310/179 |
| 6,252,326 B1 * | 6/2001 | Umeda et al. ........... 310/179 |
| 6,348,750 B1 * | 2/2002 | Taji et al. ............... 310/184 |
| 6,498,414 B2 * | 12/2002 | Asao ....................... 310/184 |
| 6,525,443 B2 * | 2/2003 | Asao ....................... 310/201 |
| 6,552,463 B2 * | 4/2003 | Oohashi et al. ......... 310/207 |
| 6,787,961 B2 * | 9/2004 | Neet et al. .............. 310/201 |
| 6,833,648 B2 * | 12/2004 | Gorohata et al. ....... 310/180 |
| 2002/0011753 A1 * | 1/2002 | Asao et al. ................ 310/45 |
| 2002/0024266 A1 * | 2/2002 | Asao ....................... 310/201 |
| 2002/0105242 A1 * | 8/2002 | Takahashi et al. ........ 310/91 |
| 2002/0153799 A1 * | 10/2002 | Kurahashi et al. ...... 310/201 |
| 2002/0158539 A1 * | 10/2002 | Oohashi et al. ......... 310/207 |
| 2003/0015932 A1 * | 1/2003 | Oohashi et al. ......... 310/201 |
| 2005/0168093 A1 * | 8/2005 | Higashino et al. ...... 310/184 |

FOREIGN PATENT DOCUMENTS

JP  2001-197709 A  7/2001

* cited by examiner

*Primary Examiner*—Tamai I Karl
(74) *Attorney, Agent, or Firm*—Sughrue Mion, PLLC

(57) ABSTRACT

In an automotive alternator according to the present invention, conductor segments of an inner winding portion and conductor segments of an outer winding portion have substantially the same shape.

6 Claims, 7 Drawing Sheets

US 7,342,340 B2

ALTERNATOR WITH IDENTICAL CONDUCTOR SEGMENTS

BACKGROUND OF THE INVENTION

1. Field of the Invention

The present invention relates to an automotive alternator mounted to an automotive vehicle such as a passenger car or a truck, for example, and particularly to a stator winding of a stator therefor.

2. Description of the Related Art

Conventionally, automotive alternators are known that include a rotor in which north-seeking (N) and south-seeking (S) poles are formed alternately in a direction of rotation; and a stator having a stator core surrounding the rotor, and a stator winding mounted in a plurality of slots formed so as to extend in an axial direction of the stator core at a distance from each other in a circumferential direction, wherein the stator winding is constructed such that a plurality of conductor segments are connected to each other, the conductor segments being formed into a general U shape composed of a pair of straight portions housed inside the slots, a linking portion linking these straight portions to each other, and joining portions disposed on tip portions of the straight portions and projecting outward from a first end surface of the stator core; and in the linking portions, which constitute a coil end of the stator winding, linking portions of first conductor segments cover linking portions of second conductor segments. (See Patent Literature 1, for example.)

Patent Literature 1

Japanese Patent Laid-Open No. 2001-231203 (Gazette: FIG. 2 to FIG. 6)

In such cases, because linking portions of first conductor segments cover linking portions of second conductor segments, one problem is that we must prepare at least two kinds of conductor segments, which means that manufacturing costs increase.

SUMMARY OF THE INVENTION

The present invention aims to solve the above problem and an object of the present invention is to provide an alternator which reduces manufacturing costs.

In order to achieve the above object, according to one aspect of the present invention, conductor segments of an inner winding portion and conductor segments of an outer winding portion are constituted by parts with a substantially identical shape.

DETAILED DESCRIPTION OF THE PREFERRED EMBODIMENTS

Embodiment 1

Figure 1:
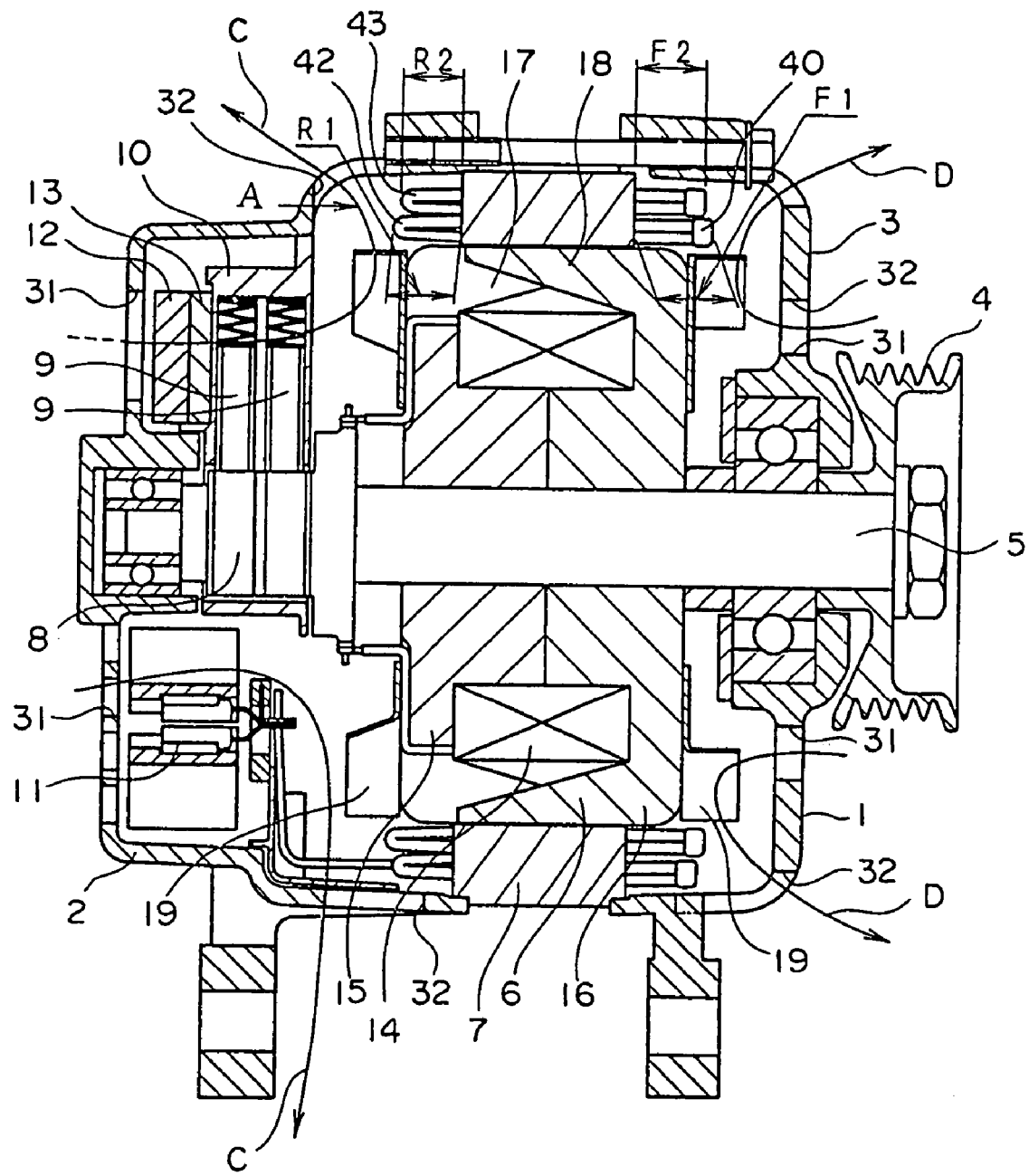
FIG. 1 is a cross section showing an automotive alternator according to Embodiment 1 of the present invention.
Figure 2:
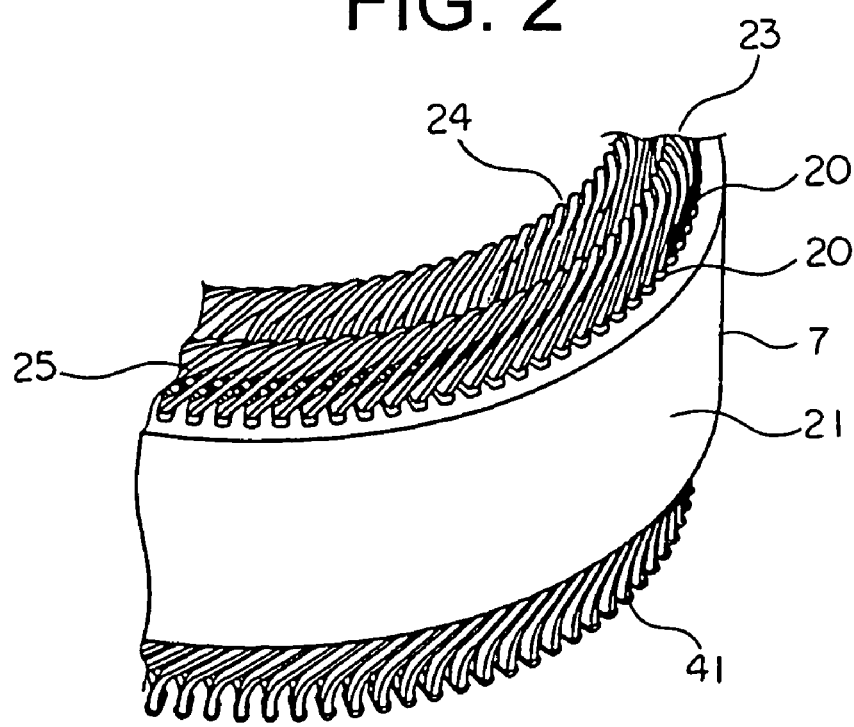
FIG. 2 is a partly perspective view of a stator from FIG. 1.
Figure 3:
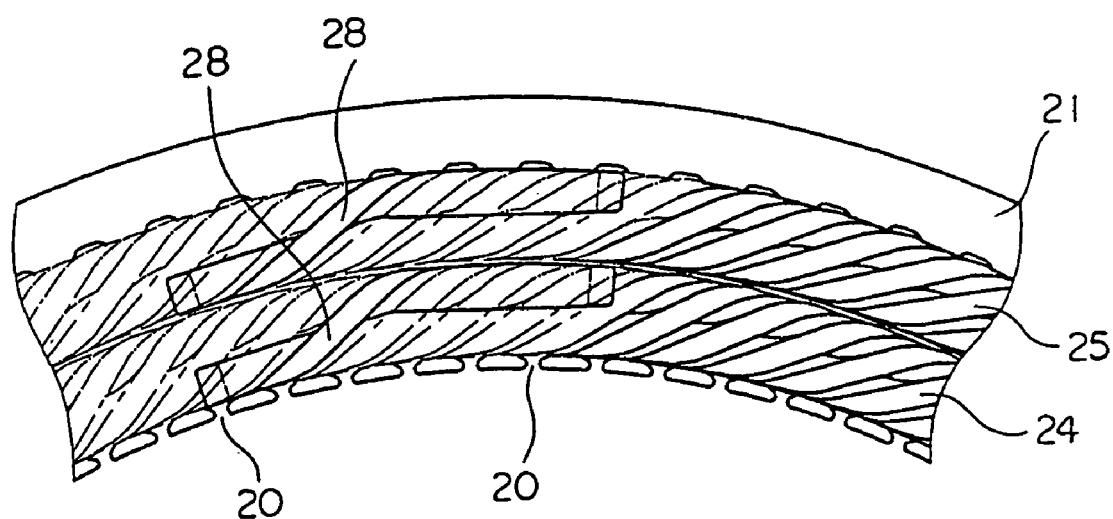
FIG. 3 is a diagram of a stator from FIG. 1 when viewed in a direction of arrows A.

FIG. 1 is a cross section showing an automotive alternator according to Embodiment 1 of the present invention, FIG. 2 is a partial perspective view of a stator 7 in FIG. 1 and FIG. 3 is a diagram of a stator 7 from FIG. 1 when viewed in a direction of arrow A.

This automotive alternator includes: a case 3 constituted by a front bracket 1 and a rear bracket 2 made of aluminum; a shaft 5 disposed inside the case 3, a pulley 4 being secured to a first end portion of the shaft 5; a Lundell-type rotor 6 secured to the shaft 5; a stator 7 secured to an inner wall surface of the case 3; slip rings 8 secured to a second end portion of the shaft 5 for supplying an electric current to the rotor 6; a pair of brushes 9 sliding in contact with the slip rings 8; a brush holder 10 housing the brushes 9; a rectifier 11 electrically connected to the stator 7 for converting an alternating current generated in the stator 7 into a direct current; and a regulator 13 fixed by adhesive to a heat sink 12 secured to the brush holder 10, the regulator 13 adjusting a magnitude of a voltage.

The rotor 6 is constituted by: a rotor coil 14 for generating a magnetic flux on passage of an electric current; and a pair of pole cores 15 and 16 disposed so as to cover the rotor coil 14, magnetic poles being formed in the pair of pole cores 15 and 16 by the magnetic flux generated by the rotor coil 14. The first and second pole cores 15 and 16 are made of iron, each having a plurality of first and second claw-shaped magnetic poles 17 and 18, respectively, disposed on an outer circumferential edge at a uniform angular pitch in a circumferential direction so as to project axially, and the first and second pole cores 15 and 16 are fixed to the shaft 5 facing each other such that the first and second claw-shaped magnetic poles 17 and 18 intermesh. In addition, centrifugal fans 19 are fixed to first and second axial end surfaces of the rotor 6.

The stator 7 is constituted by: an annular stator core 21 having a total of ninety-six (96) slots 20 formed so as to extend in an axial direction at a uniform pitch in a circumferential direction; and a stator winding 22 in which conducting wires are wound into this stator core 21 and an alternating current is generated by changes in the magnetic flux from the rotor 6 accompanying rotation of the rotor 6.

This stator winding 22 is constituted by a-phase stator winding portions, b-phase stator winding portions, and c-phase stator winding portions, disposed so as to be shifted in a circumferential direction by one slot from each other and star-connected to each other to form two three-phase stator windings.

Figure 4:
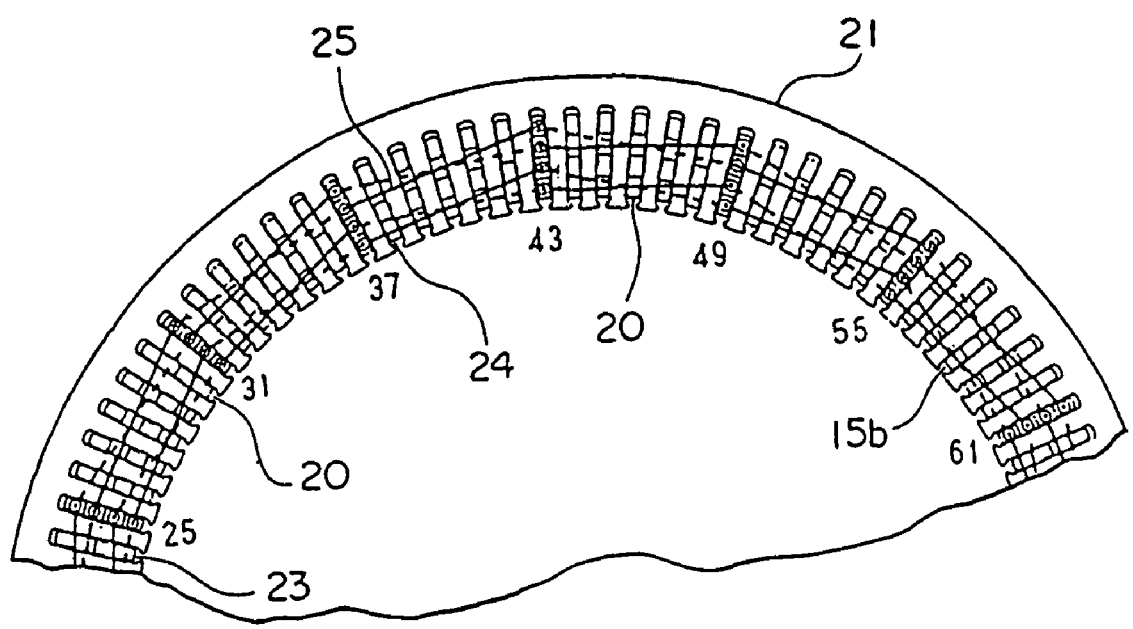
FIG. 4 is a partial connection diagram of a stator winding from FIG. 1.

FIG. 4 is a winding diagram for one of the a-phase stator winding portions 23; winding diagrams for the other a-phase stator winding portion, the b-phase stator winding portions, and the c-phase stator winding portions are not shown. Moreover, in this diagram, the solid lines in the figure represent the conducting wires at a rear bracket 2 end (linking portions of the conductor segments described below), and the broken lines represent the conducting wires at a front bracket 1 end (the joining portions of the conductor segments described below). The numerals written on an inner circumferential side of the stator core 21 in FIG. 4 represent slot numbers of the slots 20 of the stator core 21.

The a-phase stator winding portion 23 is constituted by an inner winding portion 24 and an outer winding portion 25.

In FIG. 4, the conducting wire of the inner winding portion 24 in a first position from an inner circumferential side of the slots 20 at slot number 31, for example, (hereinafter, the first position from the inner circumferential side is called Address 1, the second position Address 2, the third position Address 3, and the fourth position Address 4) extends in a clockwise direction from the rear bracket 2 end and enters a slot 20 at Address 2 of slot number 37, passes through the slot 20, and exits at the front bracket 1 end. Next, the conducting wire extends in a clockwise direction from the front bracket 1 end and enters a slot 20 at Address 1 of slot number 43, passes through the slot 20, and exits at the rear bracket 2 end. Finally, the conducting wire extends in a clockwise direction from the rear bracket 2 end and enters a slot 20 at Address 2 of slot number 49.

The conducting wire of the inner winding portion 24 in Address 1 of the slots 20 at slot number 25, for example, extends in a clockwise direction from the rear bracket 2 end and enters a slot 20 at Address 2 of slot number 31, passes through the slot 20, and exits at the front bracket 1 end. Next, the conducting wire extends in a clockwise direction from the front bracket 1 end and enters a slot 20 at Address 1 of slot number 37, passes through the slot 20, and exits at the rear bracket 2 end. Finally, the conducting wire extends in a clockwise direction from the rear bracket 2 end and enters a slot 20 at Address 2 of slot number 43.

Thus, in the inner winding portion 24, the conducting wires are wound around inside the slots 20 while being disposed repeatedly in an Address 1 layer and an Address 2 layer inside every sixth slot 20 skipping five slots in a circumferential direction from the Address 1 layer.

In FIG. 4, the conducting wire of an outer winding portion 25 in a Address 3 of the slots 20 at slot number 31, for example, extends in a clockwise direction from the rear bracket 2 end and enters a slot 20 at Address 4 of slot number 37, passes through the slot 20, and exits at the front bracket 1 end. Next, the conducting wire extends in a clockwise direction from the front bracket 1 end and enters a slot 20 at Address 3 of slot number 43, passes through the slot 20, and exits at the rear bracket 2 end. Finally, the conducting wire extends in a clockwise direction from the rear bracket 2 end and enters a slot 20 at Address 4 of slot number 49.

In FIG. 4, the conducting wire of the outer winding portion 25 in Address 3 of the slots 20 at slot number 25, for example, extends in a clockwise direction from the rear bracket 2 end and enters a slot 20 at Address 4 of slot number 31, passes through the slot 20, and exits at the front bracket 1 end. Next, the conducting wire extends in a clockwise direction from the front bracket 1 end and enters a slot 20 at Address 3 of slot number 37, passes through the slot 20, and exits at the rear bracket 2 end. Further, the conducting wire extends in a clockwise direction from the rear bracket 2 end and enters a slot 20 at Address 4 of slot number 43.

Thus, in the outer winding portion 25, the conducting wires are wound around inside the slots 20 while being disposed repeatedly in an Address 3 layer and an Address 4 layer inside every sixth slot 20 skipping five slots in a circumferential direction from the Address 3 layer.

Moreover, the other a-phase stator winding portion, the b-phase stator winding portions, and the c-phase stator winding portions are similar to the a-phase stator winding portion 23, and explanation thereof will be omitted.

Figure 5:
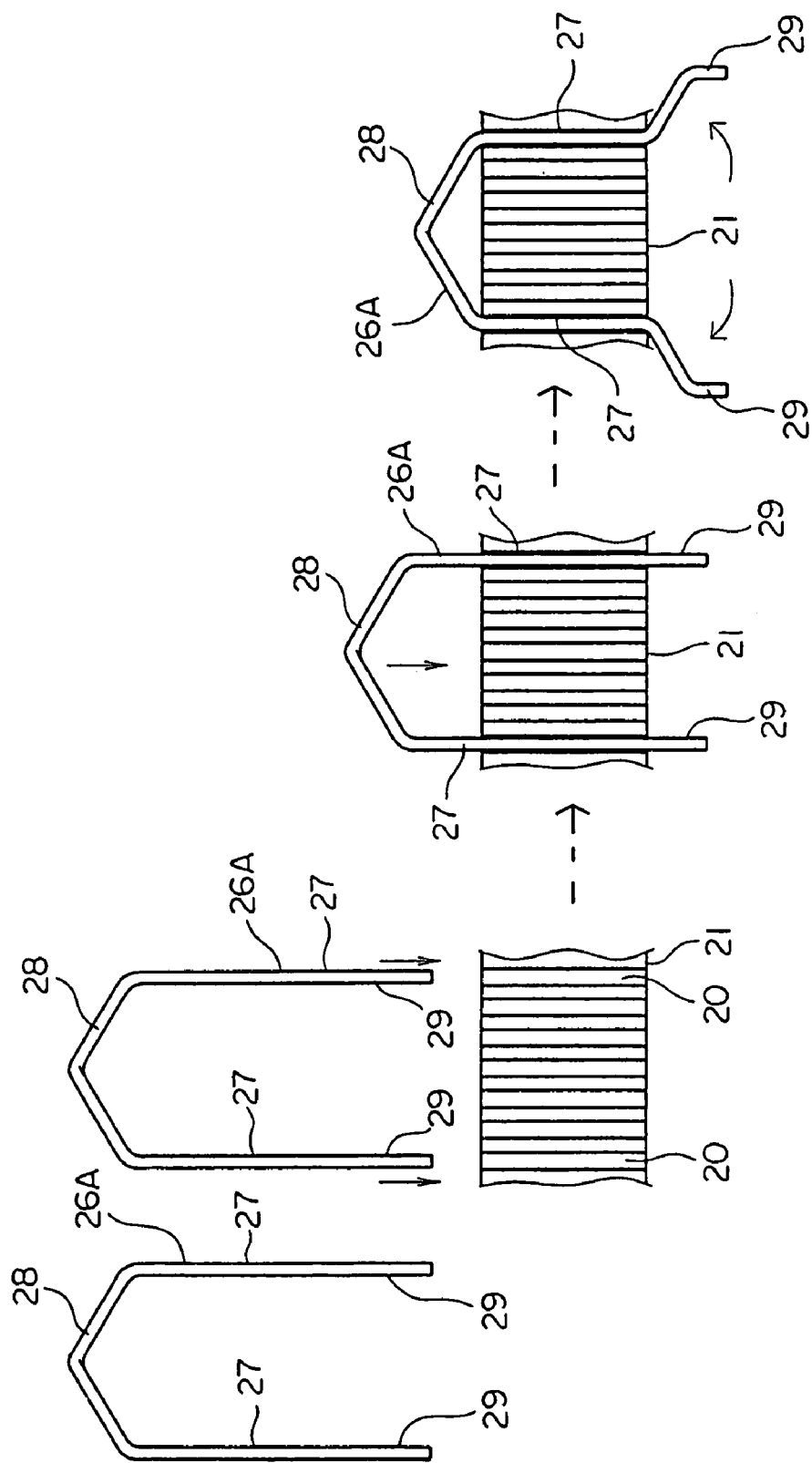
FIG. 5 is a diagram showing states of a conductor segment in an outer winding portion inserted into slots of a stator core until joining portions are deformed.
Figure 6:
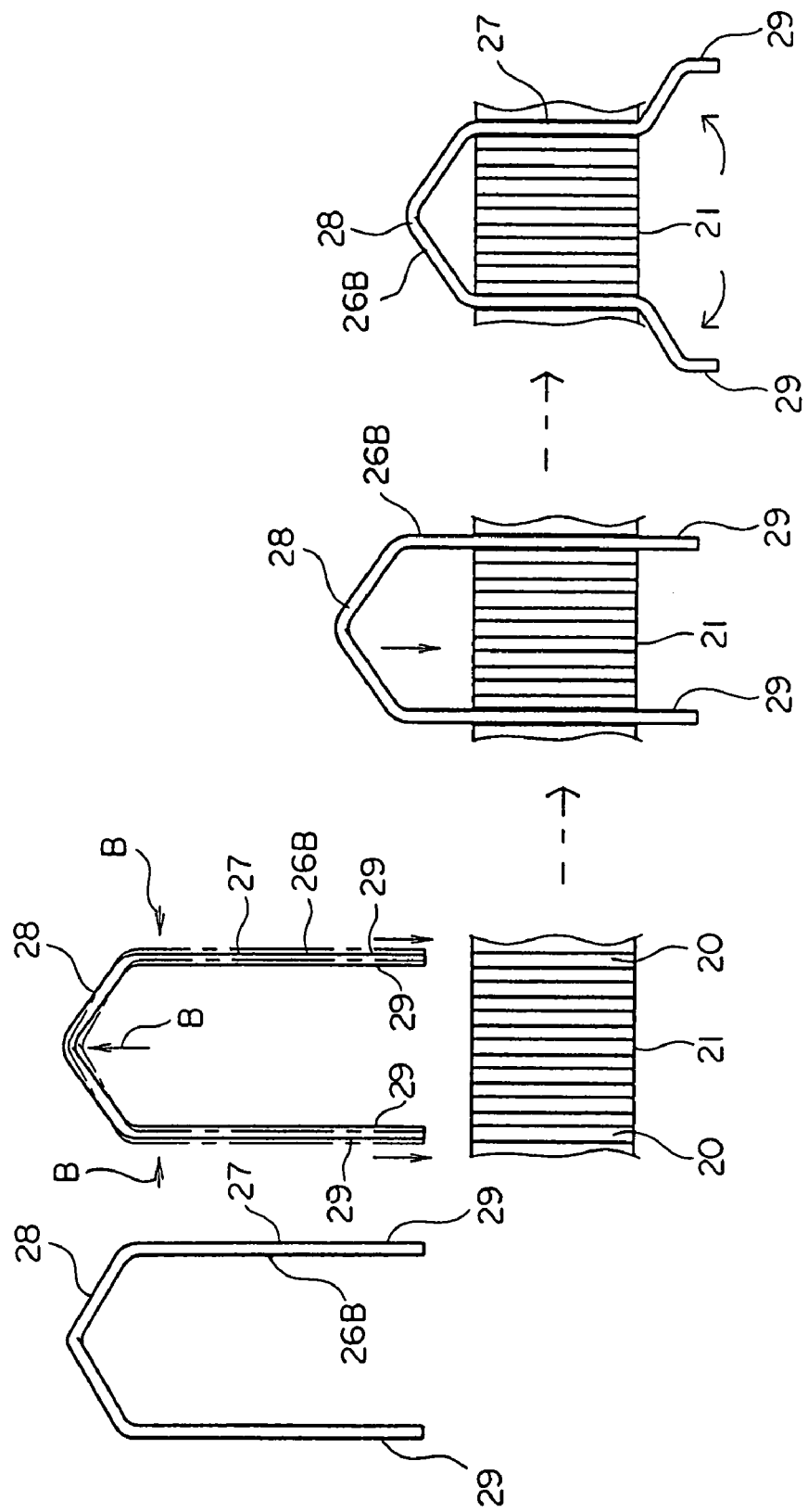
FIG. 6 is a diagram showing states of a conductor segment in an inner winding portion inserted into slots of a stator core until joining portions are deformed.

The outer winding portion 25 is constructed by connecting conductor segments 26A, as shown in FIG. 5. The inner winding portion 24 is constructed by connecting conductor segments 26B, as shown in FIG. 6. An overall conductor segment length of the conductor segments 26A when straight is equal to an overall conductor segment length of the conductor segments 26B when straight.

The conductor segments 26A and 26B, which constitute structural elements of the conducting wires, are made of a copper wire material having a round cross-sectional shape coated with an electrical insulator shaped into a general U shape, and are each constituted by: a pair of straight portions 27 housed inside the slots 20; a linking portion 28 linking the straight portions 27 to each other; and joining portions 29 disposed on tip portions of the straight portions 27 and spread outward to join adjacent conductor segments 26A and 26B to each other.

Next, a procedure for forming an a-phase stator winding portion 23 using the conductor segments 26A and 26B will be explained.

First, first straight portions 27 of the conductor segments 26A and 26B and second straight portions 27 six slots away are inserted from the rear bracket 2 end into predetermined slot numbers and addresses, four straight portions 27 of the conductor segments 26A and 26B being arranged so as to line up radially in a single column in each of the slots 20.

In this case, because the conductor segments 26B of the inner winding portion 24 are disposed radially inward compared to the conductor segments 26A of the outer winding portion 25, making the distance between the slots 20 in a circumferential direction proportionately shorter, they are inserted inside the slots 20 while deforming, as indicated by the arrows B in FIG. 6.

Thereafter, the joining portions 29 projecting outward from the straight portions 27 at the front bracket 1 end and the joining portions 29 projecting outward from straight portions 27 six slots away are joined together at the front bracket 1 end, as indicated by the broken lines in the winding diagram in FIG. 4, forming a four-turn a-phase stator winding portion 23. Moreover, as can be seen from the broken lines in FIG. 4, in the inner winding portion 24, each of the joining portions 29 of the conductor segments 26 projecting outward at the front bracket 1 end from Address 1 inside the slots 20 are joined together at the front bracket 1 end with the respective joining portions 29 of the conductor segments 26 projecting outward at the front bracket 1 end from Address 2 inside slots 20 six slots away in a counterclockwise direction. Each of the joining portions 29 of the conductor segments 26 projecting outward at the front bracket 1 end from Address 2 inside the slots 20 are joined together at the front bracket 1 end with the respective joining portions 29 of the conductor segments 26 projecting outward at the front bracket 1 end from Address 1 inside slots 20 six slots away in a clockwise direction.

As can be seen from the broken lines in FIG. 4, in the outer winding portion 25, each of the joining portions 29 of the conductor segments 26 projecting outward at the front bracket 1 end from Address 3 inside the slots 20 are joined together at the front bracket 1 end with the respective joining portions 29 of the conductor segments 26 projecting outward at the front bracket 1 end from Address 4 inside slots 20 six slots away in a counterclockwise direction. Each of the joining portions 29 of the conductor segments 26 projecting outward at the front bracket 1 end from Address 4 inside the slots 20 are joined together at the front bracket 1 end with the respective joining portions 29 of the conductor segments 26 projecting outward at the front bracket 1 end from Address 3 inside slots 20 six slots away in a clockwise direction.

Tip portions of the joining portions 29 of the conductor segments 26A and 26B are superposed radially at a position generally midway between the pairs of slots 20 in which the conductor segments 26 are inserted to facilitate a bending process, a clamp is wound on, then the tip portions are welded to each other with solder.

In this manner, in the inner winding portion 24, a joining portion coil end 40 is formed in which a plurality of connection portions in which tip portions of the joining portions 29 are connected to each other are each arranged in a row in a circumferential direction.

In the outer winding portion 25, a joining portion coil end 41 is formed in which a plurality of connection portions in which tip portions of the joining portions 29 are connected to each other are each arranged in a row in a circumferential direction.

In the inner winding portion 24, a linking portion coil end 42 is formed in which a plurality of linking portions 28 are each arranged in a row in a circumferential direction.

In the outer winding portion 25, a linking portion coil end 43 is formed in which a plurality of linking portions 28 are each arranged in a row in a circumferential direction.

In this embodiment, the conductor segments 26B of the inner winding portion 24 and the conductor segments 26A of the outer winding portion 25 are constituted by parts with a substantially identical shape, therefore a height F1 of the joining portion coil ends 40 of the inner winding portion 24 is higher than a height F2 of the joining portion coil ends 41 of the outer winding portion 25. Also, a height R1 of the linking portion coil ends 42 of the inner winding portion 24 is higher than a height R2 of the linking portion coil ends 43 of the outer winding portion 25.

Another a-phase stator winding portion; b-phase stator winding portions, and c-phase stator winding portions each having four turns are formed in a similar manner, and then these phase stator winding portions are star-connected to form three-phase stator windings.

In an automotive alternator constructed in this manner, an electric current is supplied to the rotor coil 14 from a battery (not shown) by means of the brushes 9 and the slip rings 10, generating a magnetic flux. The claw-shaped magnetic poles 17 in the first pole core 15 are magnetized into north-seeking (N) poles by this magnetic flux, and the claw-shaped magnetic poles 18 in the second pole core 16 are magnetized into south-seeking (S) poles. At the same time, rotational torque from an engine is transmitted to the shaft 5 by means of a belt (not shown) and the pulley 4, rotating the rotor 6. Thus, a rotating magnetic field is imparted to the stator winding 22, generating an electromotive force in the stator winding 22. This alternating-current electromotive force passes through the rectifier 11 and is converted into a direct current, the magnitude thereof is adjusted by the regulator 13, and the battery is charged.

Due to rotation of the centrifugal fans 19 secured to the first and second axial end surfaces of the rotor 6, at the rear bracket 2 end, external air is drawn in through the rear-end air intake apertures 31, cooling the rectifiers 11 and the regulator 13, is then deflected centrifugally by the centrifugal fans 19, cooling the linking portion coil ends 42 and 43 of the stator winding 22, and is discharged externally through the rear-end air discharge apertures 32, as indicated by arrows C in FIG. 1. At the front bracket 1 end, external air is drawn in through the front-end air intake apertures 31, is then deflected centrifugally by the centrifugal fans 19, cooling the joining portion coil ends 40 and 41 of the stator winding 22, and is discharged externally through front-end air discharge apertures 32, as indicated by arrows D in FIG. 1.

In an automotive according to this embodiment, the conductor segments 26B of the inner winding portion 24 and the conductor segments 26A of the outer winding portion 25 are constituted by parts with a substantially identical shape, enabling a single specification for the conductor segments in both the conductor segments 26A and the conductor segments 26B before reshaping, thereby reducing manufacturing costs.

Figure 7:
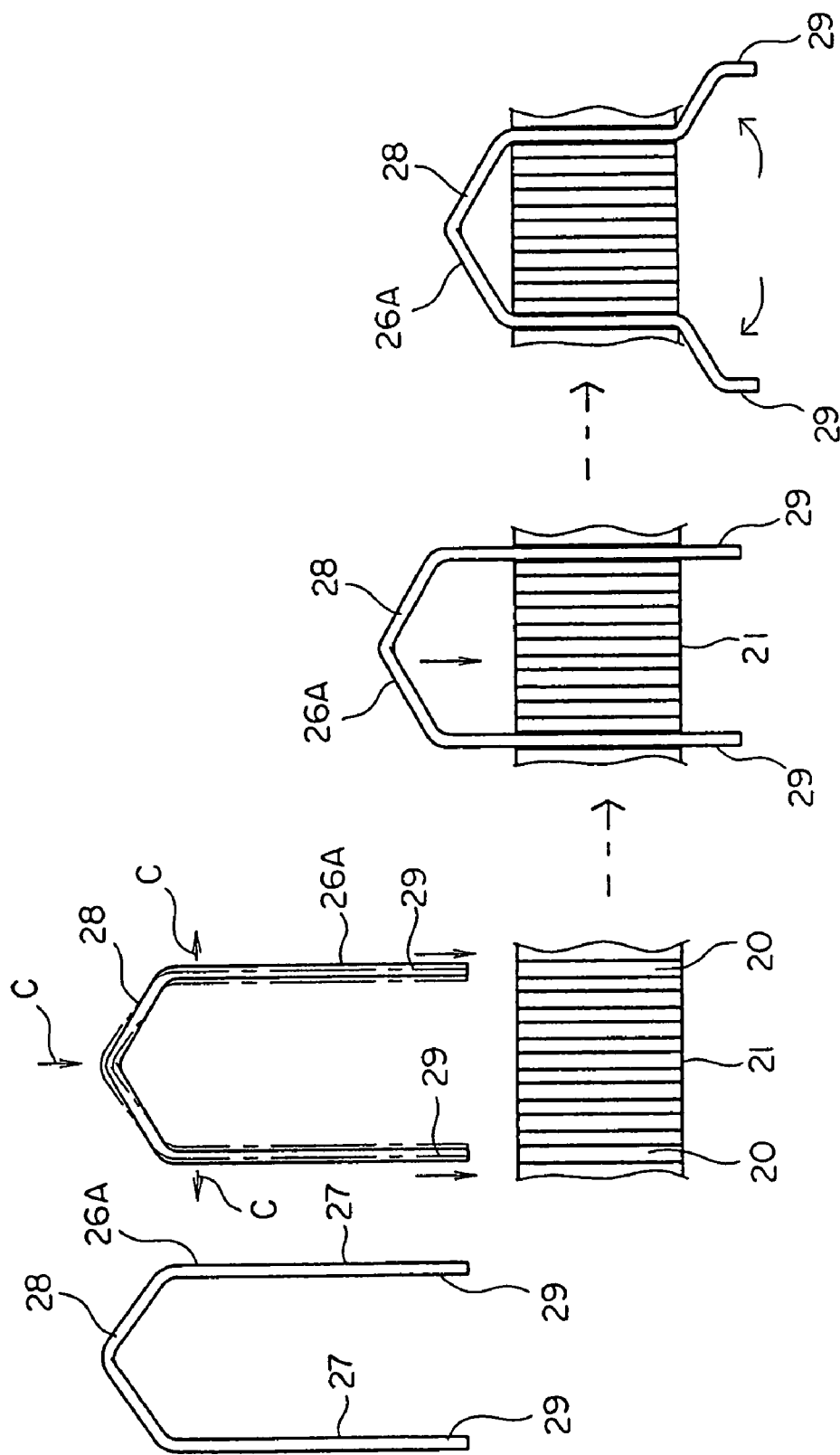
FIG. 7 is a diagram showing another example of states of a conductor segment in an outer winding portion inserted into slots of a stator core until joining portions are deformed.
Figure 8:
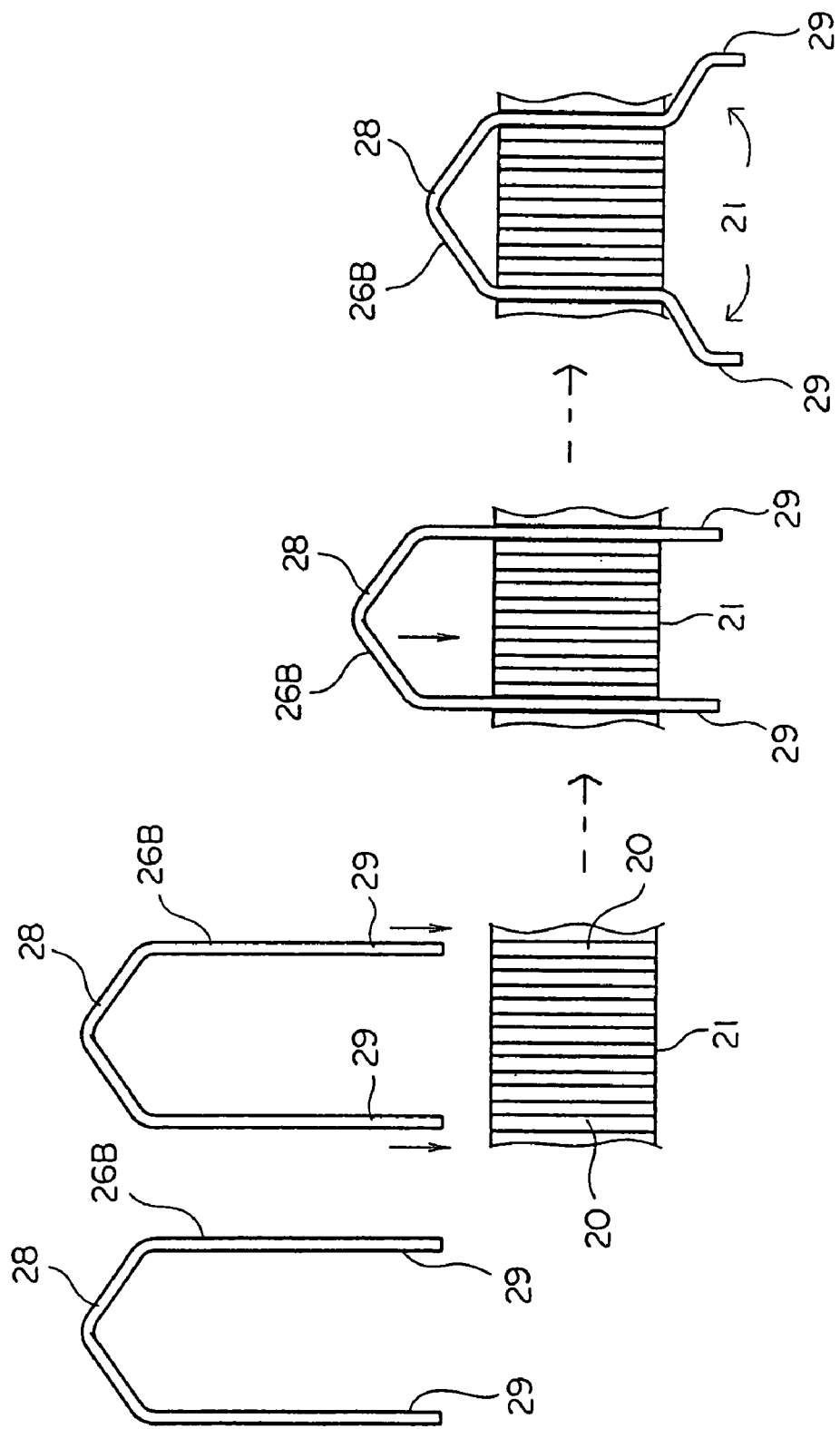
FIG. 8 is a diagram showing another example of states of a conductor segment in an inner winding portion inserted into slots of a stator core until joining portions are deformed.

More, as the conductor segments 26B constituting the inner winding portion 24 is identical to the conductor segments 26A constituting the outer winding portion 25, the conductor segments 26B of the inner winding portion 25 may be inserted into the slots 20 while deforming externally, as indicated by the arrows C in FIG. 7, the conductor segments 26B of the inner winding portion 24 may be inserted into the slots 20 as it is.

Further, a three-phase stator winding 22 in which the conductors make four turns is explained, but if high output is further required at low speed, the number of turns of the conducting wires may also be six turns or eight turns.

The present invention is not limited to automotive alternators, and can also be applied to alternators for outboard motors, for example.

What is claimed is:

1. An alternator comprising:
a rotor in which north-seeking (N) and south-seeking (S) poles are formed alternately in a direction of rotation;
a stator having:
a stator core surrounding said rotor; and
a stator winding mounted in a plurality of slots formed so as to extend in an axial direction of said stator core at a distance from each other in a circumferential direction,
said stator winding being constructed such that a plurality of conductor segments are connected to each other, said conductor segments each being formed into a substantial U shape composed of a pair of straight portions housed inside said slots, a linking portion linking said straight portions to each other, and joining portions disposed on tip portions of said straight portions and projecting outward from a first end surface of said stator core,
said stator winding being constituted by:
an inner winding portion comprising:
a joining portion coil end having a plurality of connection portions in which a joining portion of said conductor segments projecting outward from a radially innermost layer inside said slots and a joining portion of said conductor segments projecting outward from a layer immediately outside said radially innermost layer in slots a predetermined number of slots away in a circumferential direction are connected, and said plurality of connection portions are each arranged in a row in a circumferential direction; and
a linking portion coil end in which said linking portions of a plurality of said conductor segments projecting outward at a second end surface of said stator core from a radially innermost layer inside said slots and a layer immediately outside said radially innermost layer in slots a predetermined number of slots away in a circumferential direction are each arranged in a row in a circumferential direction; and
an outer winding portion comprising:
a joining portion coil end having a plurality of connection portions in which a joining portion of said conductor segments projecting outward from a radially outermost layer inside said slots and a joining portion of said conductor segments projecting outward from a layer immediately inside said radially outermost layer in slots a predetermined number of slots away in a circumferential direction are connected, and said plurality of connection portions are each arranged in a row in a circumferential direction; and
a linking portion coil end in which said linking portions of a plurality of said conductor segments projecting outward at a second end surface of said stator core from a radially outermost layer inside said slots and a layer immediately inside said radially outermost layer in slots a predetermined number of slots away in a circumferential direction are each arranged in a row in a circumferential direction, wherein:

an overall length of said conductor segments of said inner winding portion is equal to an overall length of said conductor segments of said outer winding portion, and said inner winding portion and said outer winding portion are configured such that said linking portions of said conductor segments of said inner winding portion are deformed outward while said linking portions of said conductor segments of said outer winding portion are not deformed.

2. The alternator according to claim 1, wherein:

the axial length of said joining portion coil end and said linking portion coil end of said inner winding portion is longer than the axial length of said joining portion coil end and said linking portion coil end of said outer winding portion.

3. The alternator according to claim 1, wherein said conductor segments of said inner winding portion are interchangeable with said conductor segments of said outer winding portion.

4. An alternator comprising:

a rotor in which north-seeking (N) and south-seeking (S) poles are formed alternately in a direction of rotation;

a stator having:

a stator core surrounding said rotor; and a stator winding mounted in a plurality of slots formed so as to extend in an axial direction of said stator core at a distance from each other in a circumferential direction, said stator winding being constructed such that a plurality of conductor segments are connected to each other, said conductor segments each being formed into a substantial U shape composed of a pair of straight portions housed inside said slots, a linking portion linking said straight portions to each other, and joining portions disposed on tip portions of said straight portions and projecting outward from a first end surface of said stator core, said stator winding being constituted by:

an inner winding portion comprising:

a joining portion coil end having a plurality of connection portions in which a joining portion of said conductor segments projecting outward from a radially innermost layer inside said slots and a joining portion of said conductor segments projecting outward from a layer immediately outside said radially innermost layer in slots a predetermined number of slots away in a circumferential direction are connected, and said plurality of connection portions are each arranged in a row in a circumferential direction; and a linking portion coil end in which said linking portions of a plurality of said conductor segments projecting outward at a second end surface of said stator core from a radially innermost layer inside said slots and a layer immediately outside said radially innermost layer in slots a predetermined number of slots away in a circumferential direction are each arranged in a row in a circumferential direction; and an outer winding portion comprising:

a joining portion coil end having a plurality of connection portions in which a joining portion of said conductor segments projecting outward from a radially outermost layer inside said slots and a joining portion of said conductor segments projecting outward from a layer immediately inside said radially outermost layer in slots a predetermined number of slots away in a circumferential direction are connected, and said plurality of connection portions are each arranged in a row in a circumferential direction; and a linking portion coil end in which said linking portions of a plurality of said conductor segments projecting outward at a second end surface of said stator core from a radially outermost layer inside said slots and a layer immediately inside said radially outermost layer in slots a predetermined number of slots away in a circumferential direction are each arranged in a row in a circumferential direction, wherein:

an overall length of said conductor segments of said inner winding portion is equal to an overall length of said conductor segments of said outer winding portion, and said inner winding portion and said outer winding portion are configured such that said linking portions of said conductor segments of said outer winding portion are deformed inward while said linking portions of said conductor segments of said inner winding portion are not deformed.

5. The alternator according to claim 4, wherein:

the axial length of said joining portion coil end and said linking portion coil end of said inner winding portion is longer than the axial length of said joining portion coil end and said linking portion coil end of said outer winding portion.

6. The alternator according to claim 4, wherein said conductor segments of said inner winding portion are interchangeable with said conductor segments of said outer winding portion.

* * * * *